M. A. KENNEDY.
TIRE TREAD FOR MOTOR VEHICLES.
APPLICATION FILED JAN. 18, 1909.

979,008.

Patented Dec. 20, 1910.

WITNESSES

INVENTOR.
M. A. KENNEDY.
ATTYS.

UNITED STATES PATENT OFFICE.

MICHAEL ALEXANDER KENNEDY, OF TORONTO, ONTARIO, CANADA.

TIRE-TREAD FOR MOTOR-VEHICLES.

979,008.  Specification of Letters Patent.  Patented Dec. 20, 1910.

Application filed January 16, 1909. Serial No. 472,697.

*To all whom it may concern:*

Be it known that I, MICHAEL ALEXANDER KENNEDY, of the city of Toronto, in the county of York, in the Province of Ontario, Canada, have invented certain new and useful Improvements in Tire-Treads for Motor-Vehicles, of which the following is the specification.

My invention relates to improvements in tire treads for motor vehicles, and the object of the invention is to devise a protecting supplemental tread for the solid rubber tread, which will permit of a maximum resiliency of the rubber tread and yet prevent it from being sheared, worn or otherwise deleteriously affected and thus serve to prolong the life of the rubber tread.

A further object is to make the protecting tread of such a construction as will be readily adaptable to rubber treads now commonly in use.

My invention consists of a supplemental protecting tread comprising a series of sections preferably of steel made to fit the form of the tread crosswise, and abutting each other circumferentially, and an encompassing band or bands for holding the sections together and so connected to them as to allow the sections to conform to the yield of the rubber tread under weight as the wheels rotate, the parts being otherwise constructed and arranged in detail as hereinafter more particularly explained.

Figures 1, 2, 3:
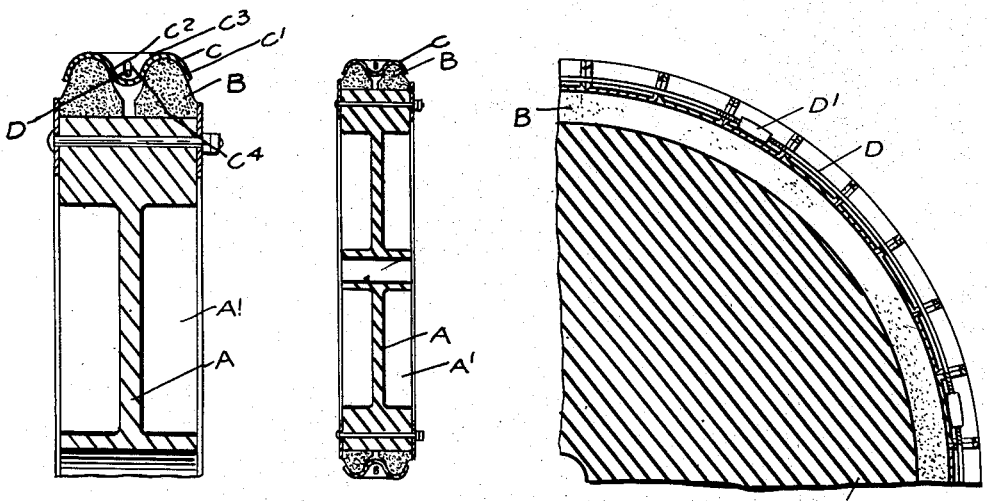
Figure 4:
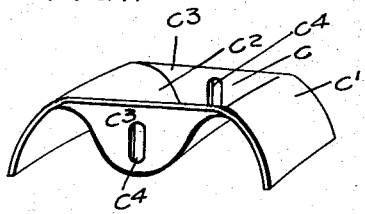

Figure 1, is a cross section of a wheel having my improved tread. Fig. 2, is an enlarged cross section from the axis outwardly. Fig. 3, is an enlarged section on a plane with the face of the wheel. Fig. 4, is a perspective detail of one of the sections shown in the above figures.

In the drawings like letters of reference indicate corresponding parts in each figure.

A is a wheel and A' the rim thereof. I claim nothing in the form of the wheel or rim, and, therefore, I do not detail the particular construction thereof.

My invention is particularly adapted to motor trucks or freight lorries, although it may be adapted to other vehicles with facility.

In Figs. 1, 2, 3 and 4 I have shown a form of construction which is generally adapted for freight trucks or other heavy vehicles in which there is employed the resilient member or tread comprising a plurality of parallel rings B, preferably of solid rubber, passing circumferentially around the rim of the wheel. In this case however, it is not intended that the elastic or resilient tread member shall come in direct contact with the ground, their contact being prevented by the use of a circumferential series of transversely extending sections or metallic members extending across the full width of the resilient tread member. These sections C will vary in form according to the shape of the resilient tread member of the wheel. In the case of the form shown in Figs. 1, 2, 3 and 4, the section C comprises a flat tread portion or face $C^2$ bridging across the whole width of the resilient member and concaved on its inside to fit over the two elastic treads B. Intermediate of their ends these sections are provided with inwardly projecting retaining lugs $C^3$ provided with vertical or radially extending slots $C^4$ through which may be passed the sections D of an encircling or circumferential retaining band, said sections D being connected to each other adjustably by means of turn buckles D'. In this form the lateral wings are extended as shown at C' to overlap for a considerable portion the outside faces of the elastic treads B. The slot $C^4$ in the lugs $C^3$ serves to allow each member to yield independently of the adjacent members without disturbing or straining the encircling band which retains them all in place.

The construction above described serves a two-fold purpose, namely that of increasing the tractive power of the wheel on the roadway by reason of the independent yielding of the sections and also serves to protect the elastic or resilient rubber treads from injury and wear while preserving the requisite resiliency of the tire.

What I claim as my invention is:

1. A tire for a vehicle wheel embracing in combination a plurality of separate parallel circumferential resilient treads, and a series of encompassing metallic sections extending across the full width of the resilient treads to prevent their contact with the ground, the said sections being provided with transverse retaining lugs projecting inwardly from their tread portions between the resilient treads, and retaining means passing through each of said lugs circumferentially around the wheel to hold the sections in proper position, substantially as described.

2. The combination with a double rubber tire, the two portions of which have a rounded or beaded outer periphery, of a protecting metal tire comprising a series of sections formed with wings corresponding in cross sectional form to the outer periphery of the tire, and each having a connecting bridge reversely curved and end fins having slots elongated from inside to outside, and an encompassing band suitably connected together and passing through the several circumferentially alined slots as and for the purpose specified.

3. In a protecting tire for motor vehicles formed of a series of sections, a section formed with concave outer wings to conform to the form of the tire, a connecting bridge, and end fins slotted from outside to inside as and for the purpose specified.

4. A protecting tread for vehicle tires comprising a series of metallic sections, each consisting of a plate formed with a plurality of parallel concave trough-like portions, transverse webs forming the end walls of said section and uniting the trough-like parts together, said end walls being provided with vertical closed slots, and an annular retaining band passing through the slots of the various sections between the trough-like parts of the sections to encircle the tire and hold the sections yieldingly together, substantially as described.

MICHAEL ALEXANDER KENNEDY.

Witnesses:
B. BOYD,
R. COVAIN.